United States Patent

[11] 3,534,746

| [72] | Inventor | Samuel Posner |
| | | 6060 Crescentville Road, Philadelphia, Pennsylvania 19126 |
| [21] | Appl. No. | 754,312 |
| [22] | Filed | Aug. 21, 1968 |
| [45] | Patented | Oct. 20, 1970 |

[54] PORTABLE CLEANER FOR TRAILER INTERIORS
9 Claims, 4 Drawing Figs.

[52] U.S. Cl. .................................................. 134/46,
118/3, 118/306, 134/52, 134/167, 239/159
[51] Int. Cl. ..................................................... B08b 3/02,
B08b 9/00
[50] Field of Search .......................................... 134/46,
52, 53, 57, 45, 123, 166, 167, 168; 239/159, 160, 161, 167; 118/3, 108, 207, 306

[56] References Cited
UNITED STATES PATENTS

| 1,628,141 | 5/1927 | Gray | 134/168X |
| 2,710,616 | 6/1955 | Tydings | 134/167 |
| 2,751,882 | 6/1956 | Coyner | 134/123UX |
| 2,752,925 | 7/1956 | Friers | 134/123 |
| 2,874,677 | 2/1959 | Braun et al. | 118/306X |
| 3,163,149 | 12/1964 | Ivey | 239/159X |
| 3,208,460 | 9/1965 | Heinicke | 118/306X |
| 3,315,691 | 4/1967 | Widner | 134/123X |
| 3,461,889 | 8/1969 | Saxonmeyer | 134/45X |

FOREIGN PATENTS

| 639,752 | 7/1950 | Great Britain | 134/45 |

*Primary Examiner*—Robert L. Bleutge
*Attorney*—McClure Weiser and Millman

ABSTRACT: A portable self-propelled device for cleaning interiors of box type vehicle bodies, such as trailer bodies, including a spraying frame, a switch responsive to contact with a side wall of a trailer body to activate the spray of steam or cleaning solution only when the frame is inside the body, a switch responsive to contact with the front wall of the trailer body to cause the frame to reverse its travel after it has reached the front wall of the body, a variable spray frame to alter the spray direction to accommodate different interiors and downwardly directed spray nozzles to effectively clean and remove debris from the floor of the vehicle body as well.

Patented Oct. 20, 1970 3,534,746

INVENTOR.
SAMUEL POSNER
BY
Max R. Millman
ATTORNEY

INVENTOR.
SAMUEL POSNER
BY
ATTORNEY

PORTABLE CLEANER FOR TRAILER INTERIORS

Vehicle bodies which transport meats, produce and similar viable food products require frequent thorough cleaning of their interiors after unloading and prior to reuse. Heretofore this was accomplished manually with the use of hoses, brushes, etc.

The primary object of this invention is to provide a portable device for automatically, efficiently, economically and thoroughly cleaning such vehicle body interiors.

Another object of the invention is to provide a device of the character described in the form of a spray frame which is self-propelled and guided in its movement in the interior of the vehicle body and means to deliver steam or a cleaning solution to the sprays while the frame is inside the body and to discontinue it when the frame is outside the body.

Another object is to provide a cleaning device of the character described in which a sensing device is carried by the frame and operatively connected to the motive means which upon contact with the front wall of the body will reverse the motive means and cause the frame to move back automatically from front to rear of the body.

Another object of the invention is to provide a vehicle body interior cleaning device in which the spray frame is mounted on a vertically adjustable platform for accomodation to vehicle bodies whose rear sills vary in height above the ground level.

Another object of the invention is to provide a vehicle body interior cleaning device having a collection trough and sprays in advance thereof so directed as to cause debris on the floor of the vehicle body to be blown into the trough, thus providing for complete cleaning of the vehicle body interior.

Another object of the invention is to provide a vehicle body interior cleaning device in which the spray frame or rack can be adjusted to accomodate different types of meat hook arrangements in the interiors of the bodies to thus provide more effective cleaning thereof.

These and other objects of the invention will become more apparent as the following description proceeds in conjunction with the accompanying drawings, wherein.

Specific reference is now made to the drawings in which similar reference characters are used to indicate the same elements throughout.

Figure 1:
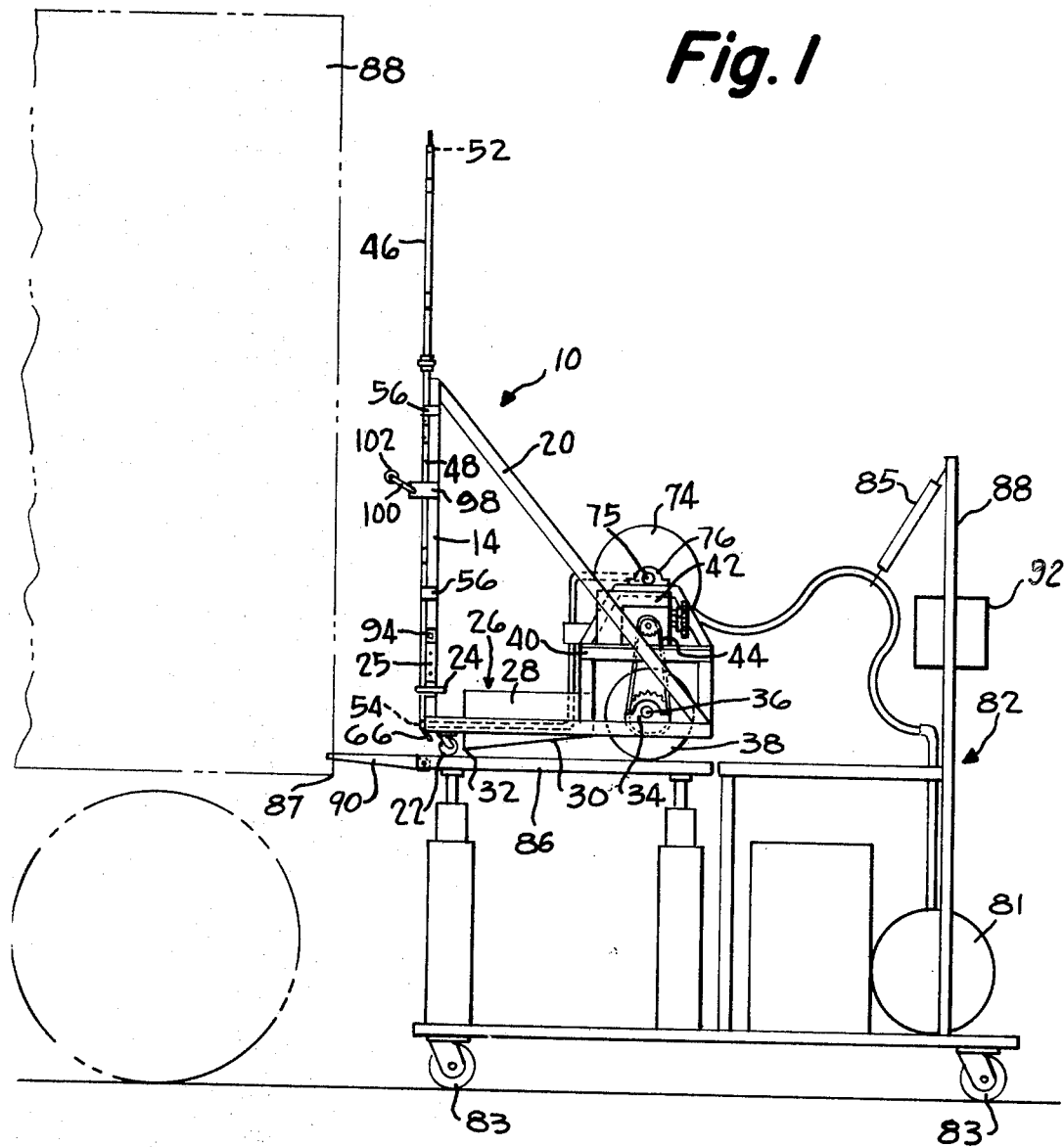
FIG. 1 is a side elevational view of the cleaner embodying the instant invention.
Figure 2:
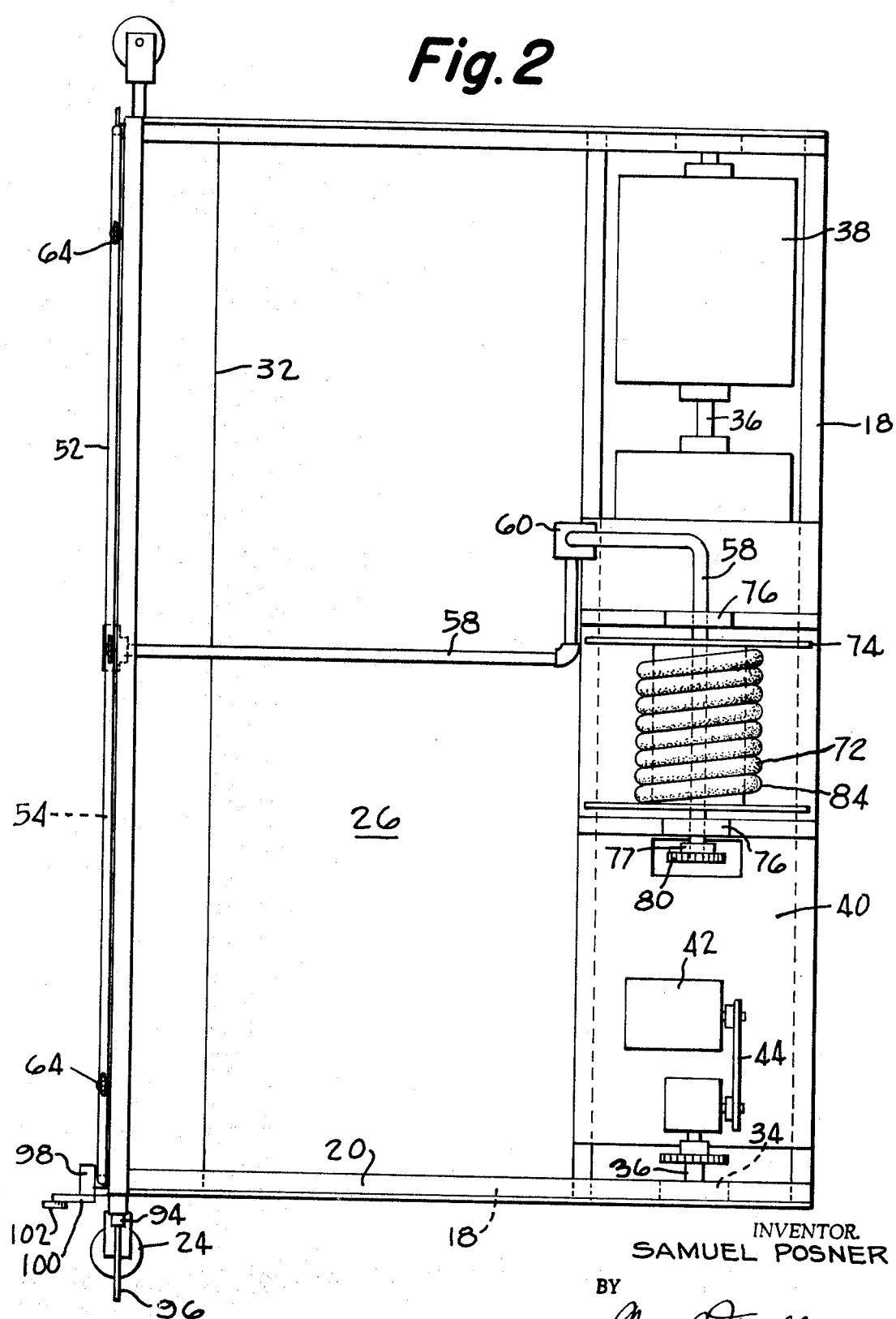
FIG. 2 is a top plan view thereof.
Figure 3:
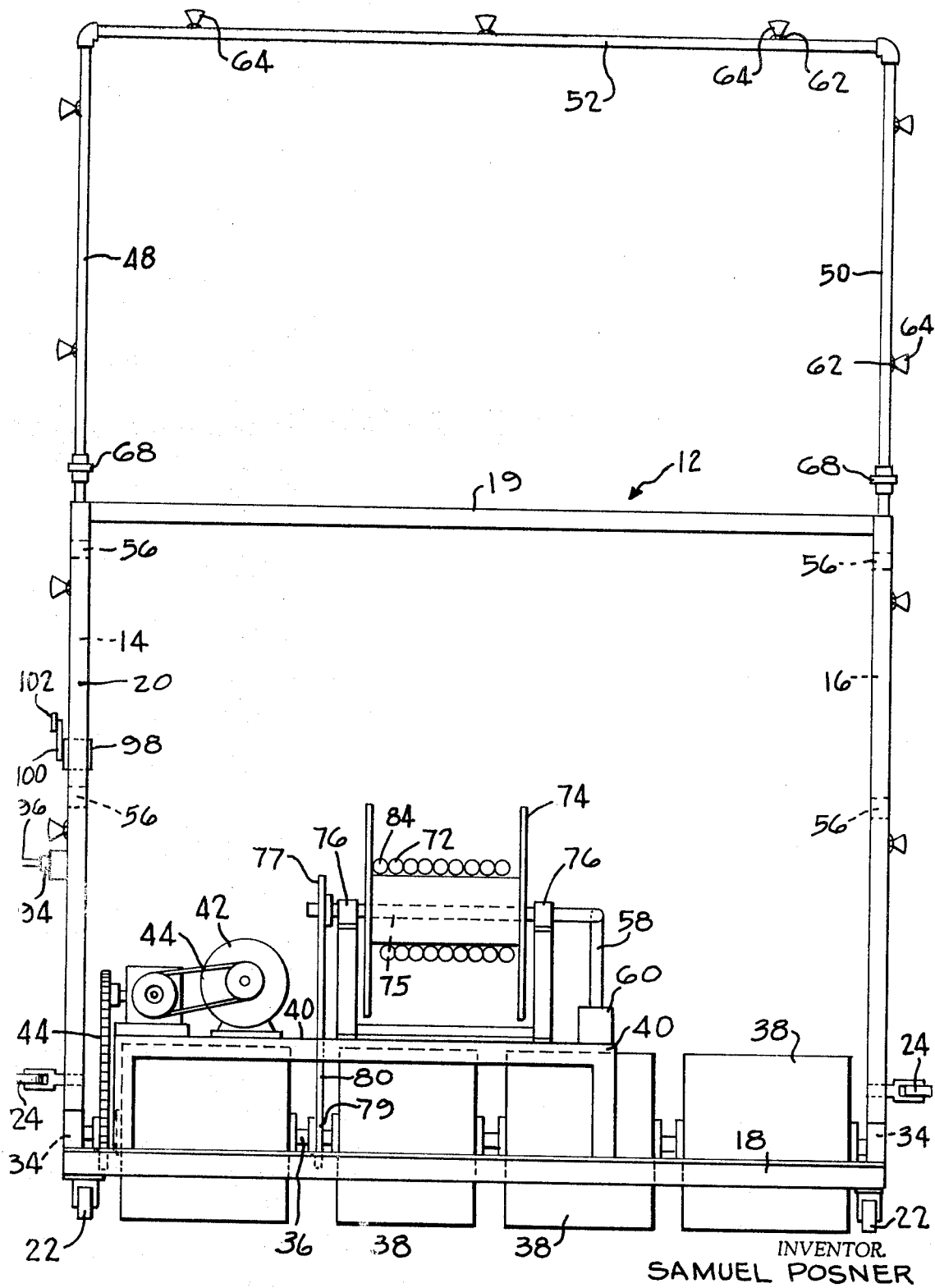
FIG. 3 is front view thereof.

The cleaner is generally indicated at 10 and is in effect a motorized self-propelled frame 12 equipped with means to spray the interior of a vehicle, such as a semitrailer, which has carried viable food products such as meats, produce and the like. The frame includes transversely spaced vertical members 14 and 16 connected at their bottom ends by a lower horizontal, substantially rectangular frame member 18 and at their upper ends by a member 19 and suitably reinforced by diagonal brace members 20. The frame is preferably of angle iron construction and includes caster wheels 22 carried by the frame members 18 at their front ends and wall engaging, spring-loaded guidance rollers 24 carried by the vertical members 14 and 16 adjacent their lower ends, there being spaced apertures 25 to adjust the height of the rollers 24. A trough 26 is provided which extends the complete width of the frame member 18, and has vertical side plates 28 and a downwardly and forwardly inclined bottom plate 30 whose forward edge 32 is closely adjacent the casters 22 and the ground level, as clearly seen in FIG. 1, for a purpose soon to appear.

The side members of the lower horizontal frame 18 carry at their rear ends sealed bearing blocks 34 which rotatably journal a shaft 36 upon which is secured a plurality of rubber covered, transversely spaced ground-engaging rollers 38. A framed support 40 is secured upon the lower horizontal frame 18 above one of the roller sections and mounts a reversible variable speed drive motor 42 which is operatively connected by appropriate gears and chain drive 44 to one end of the shaft 36 to thus drive the rollers in unison.

A spray unit 46 is provided in the form of interconnected vertical pipes 48 and 50 connected top and bottom with horizontal pipe sections 52 and 54, the vertical pipe sections being mounted on the angle frame members 14 and 16 by suitable means such as straps 56. A longitudinally extending supply pipe 58 is connected by a T fitting to the spray unit and extends at its forward end through a solenoid valve 60.

Mounted as at 62 in the pipe sections are spray nozzles 64, preferably of the flat fan type, the mounting 62 being of the ball type to provide for angular adjustability. The nozzles 66 carried by the lower horizontal pipe section 54 are angled downwardly and inwardly to blow debris from the floor of the vehicle into the trough 26 through its lowermost open end.

To allow the spray unit to be accomodated to vehicles of different interior constructions, unions 68 may be provided to allow for interchange with other upper pipe sections.

The supply pipe 58 is connected by appropriate pipe sections 70 to a hose 72 which is fed from a reel 74 whose shaft 75 is mounted for rotation in bearings 76 that are in turn mounted upon the framed support 40 above the rollers 38. The shaft 75 of the reel is driven by the shaft 36 of the rollers by suitable sprockets 77 and 79 on the shafts and a chain 80 is entrained thereover. The hose 72 is connected to a conventional steam generator 81 which is mounted at the bottom of a framed support 82 that is in turn mounted on caster wheels 83. Instead of a steam generator a reservoir of detergent or other cleaning solution and pump can be provided to deliver the cleaning solution to the spray unit. The hose 72 and electrical cable 84 are payed out and reeled together. In the event that the rollers 78 may slip while the cable 84 and hose 72 are still paying out, a spring 85 may be mounted on an extension of the frame 88 and made to engage the hose 72 intermediate its ends.

One end of the support 82 is equipped with a manual or hydraulically operable, vertically adjustable platform 86 upon which is supported the cleaning device 10 so that it can be raised or lowered to accomodate the rear sills 87 of vehicles or trailer bodies 88 whose height above ground level may vary. To allow for smooth entry of the cleaning unit into the vehicle body, a tail gate 90 may be hinged to the front of the platform.

Figure 4:
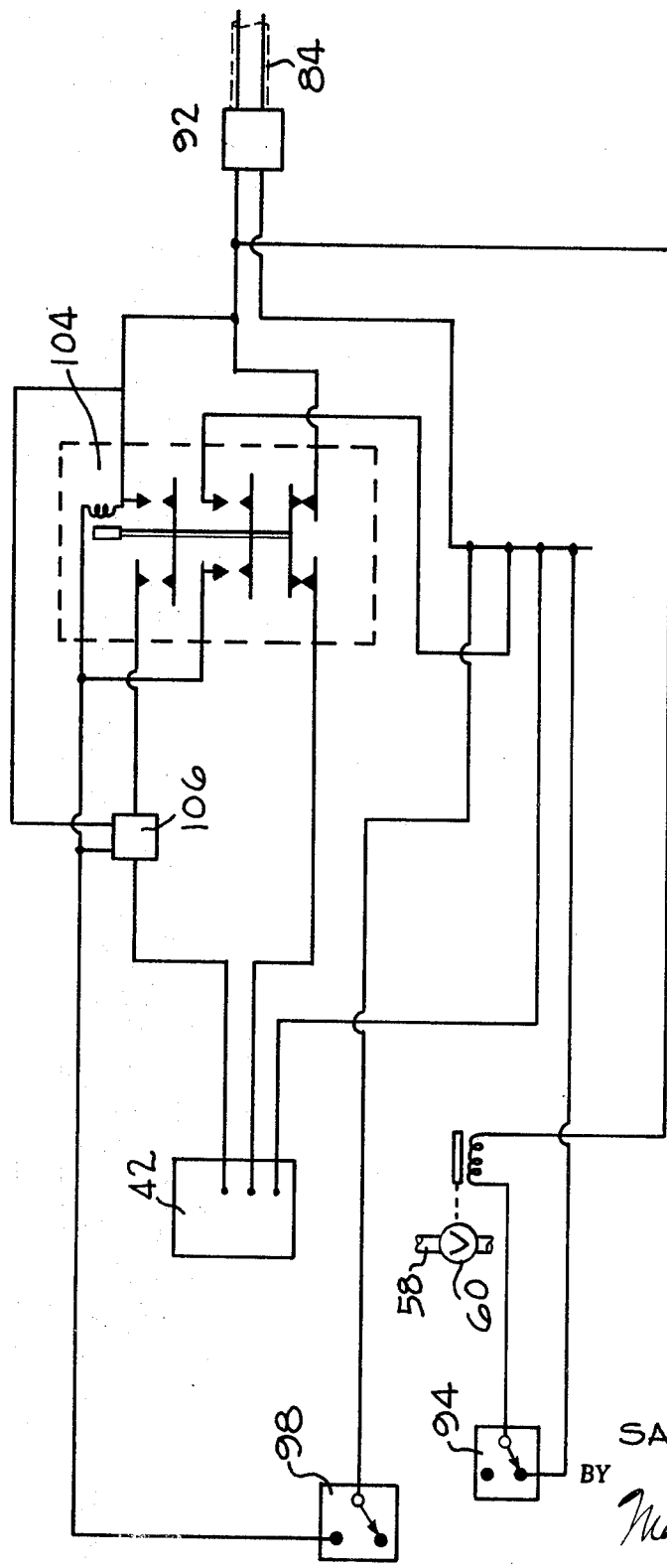
FIG. 4 is a schematic wiring diagram of the electrical controls for the cleaner.

In use, the entire unit is wheeled to the site of a vehicle and the platform 86 is raised to a position level with the rear sill 87 of the vehicle after the doors of the vehicle have been swung open. The cable 84, see FIG. 4, from the circuit breaker starter switch 92 on the support 82 is plugged into an electrical source which turns on the motor 42 whereupon the rotation of the drum rollers 38 causes the cleaning device to move forward into the interior of the vehicle. This in turn causes the reel 74 to rotate in the same direction as the drum rollers to pay out cable 84 and hose 72. The movement of the device in proper alignment within the vehicle is guided by engagement of the guide rollers 24 with the walls of the vehicle. Mounted on one of the vertical members 14 of the frame is a normally open micro switch 94 having a spring urged depressable probe or contact 96 which, when it engages a wall, closes the switch 94 and opens the solenoid valve 60 thereby allowing steam from the generator (or cleaning solution from a pump) to be delivered to the sprays only when the pipes are actually within the confines of the vehicle body. The spray nozzles 64 deliver a spray of steam in cleaning solution against the walls and the ceiling of the vehicle body and the spray nozzles 66 across the bottom of the frame act to blow debris from the floor into the trough 26.

Mounted on one of the vertical members 14 of the frame is a normally open micro switch 98 having a movable contact 100 with a roller 102 at its end. When the cleaning device reaches the end of its forward travel in the vehicle body, the roller 102 engages the front wall and the movable contact closes the switch 98. This energizes relay 104 and redirects current flow through the time delay relay 106 to the motor 42 to cause it to reverse thereby reversing the rotation of the drum rollers 28 and the reel 74 and hence the movement of the cleaning device. When the device reaches the rear of the vehicle body and the probe 96 of switch 94 is out of engagement with the wall, the flow of steam or other fluid to the spray nozzles stops because the solenoid valve closes. Throwing the starter switch 92 will than stop the movement of cleaning device. It is anticipated that complete cleaning may be effected by a single pass to and fro in the vehicle body. If not, the process can be repeated. The entire cleaning time, in any event, will be considerably shorter than that required in a hand cleaning and scrubbing operation.

While a preferred embodiment a has here been shown and described, it will be understood that minor variations may be made by skilled artisans without departing from the spirit of the invention and the scope of the appended claims.

I claim:

1. A device for cleaning the interior of a substantially rectangular body comprising a substantially rectangular member disposed in a vertical plane consisting of interconnected pipes carrying spray nozzles, a wheeled frame supporting said member, means carried by said frame to propel it to and fro in said body from its rear end to its front and back to its rear end again, means to deliver fluid to said spray nozzles, and means to actuate said fluid delivery means only when said pipe member is in the interior of said body.

2. The combination of claim 1 wherein said means to propel said wheeled frame includes a roller member rotatable mounted on said frame to the rear of said pipe member and a motor on said frame operatively connected to said roller member.

3. The combination of claim 2 wherein said motor is reversible and means to reverse the movement of said frame when it reaches the front of said body including a normally open switch operatively connected to said motor via a relay, said switch including a movable contact adapted to engage the front wall of the body, close said switch and energize said relay to complete a circuit which reverses said motor.

4. The combination of claim 1 wherein said fluid delivery means includes a fluid source and a hose therefrom connected to said pipe member, said actuating means including a solenoid valve interposed in said hose and a normally open switch carried by said frame and operatively connected to said valve acting to close it, said switch including a movable contact engageable with a side wall of the body to open said switch and said valve.

5. The combination of claim 1 and a trough carried at the bottom of said frame having a downwardly and forwardly inclined bottom wall so that the spray from nozzles at the bottom of said pipe member will blow debris from the floor of the body into the trough.

6. A device for cleaning the interior of a substantially rectangular body comprising a substantially rectangular member disposed in a vertical plane consisting of interconncected pipes carrying spray nozzles, a wheeled frame supporting said member, means carried by said frame to propel it to and fro in said body from its rear end to its front and back to its rear end again, and means to deliver fluid to said spray nozzles, wherein said means to deliver fluid to said spray nozzles includes a fluid reservoir, a hose connected to said pipe member and reservoir and a hose reel mounted on said frame, said means to propel said frame also acting to rotate said reel.

7. The combination of claim 6 and a support for said device including a vertically adjustable platform for said wheeled frame.

8. The combination of claim 6 wherein said spray nozzles are mounted on said pipes for angular adjustment.

9. The combination of claim 6 and means to guide the movement of said frame in said body, including spring urged rollers mounted on said frame extending laterally therefrom and adapted to engage the side walls of said body.